United States Patent
Mege et al.

(10) Patent No.: US 6,829,317 B2
(45) Date of Patent: Dec. 7, 2004

(54) SIGNALLING METHOD IN A RADIO COMMUNICATION SYSTEM, AND TRANSMITTERS, RECEIVERS AND REPEATERS FOR IMPLEMENTING THE METHOD

(75) Inventors: Philippe Mege, Bourg la Reine (FR); Fabrice Belveze, Maurepas (FR)

(73) Assignee: Matra Nortel Communications, Quimper (FR)

(*) Notice: Subject to any disclaimer, the term of this patent is extended or adjusted under 35 U.S.C. 154(b) by 763 days.

(21) Appl. No.: 09/733,199

(22) Filed: Dec. 8, 2000

(65) Prior Publication Data

US 2001/0005406 A1 Jun. 28, 2001

(30) Foreign Application Priority Data

Dec. 10, 1999 (FR) ............................................ 99 15602

(51) Int. Cl.[7] ................................................ H04L 7/00
(52) U.S. Cl. ....................... 375/368; 375/211; 375/367; 370/321
(58) Field of Search ................................ 375/211, 212, 375/213, 214, 215, 219, 340, 343, 364, 365, 367, 368, 370; 370/315, 321, 324, 326, 345, 350; 455/7, 20, 21

(56) References Cited

U.S. PATENT DOCUMENTS

| | | | |
|---|---|---|---|
| 4,649,543 A | | 3/1987 | Levine ........................ 714/774 |
| 5,511,099 A | * | 4/1996 | Ko et al. ..................... 375/368 |
| 5,550,831 A | | 8/1996 | Tanahashi .................... 370/321 |
| 5,862,172 A | * | 1/1999 | Sugita et al. ................ 375/142 |
| 6,014,175 A | * | 1/2000 | Hallman et al. ............ 348/469 |
| 6,088,411 A | * | 7/2000 | Powierski et al. .......... 375/364 |
| 6,463,107 B1 | * | 10/2002 | Lindoff et al. .............. 375/343 |
| 6,674,792 B1 | * | 1/2004 | Sugita ........................ 375/148 |

FOREIGN PATENT DOCUMENTS

| | | |
|---|---|---|
| DE | 197 43 170 A 1 | 4/1999 |
| EP | 0 324 420 A2 | 7/1989 |
| WO | WO 96/34481 | 10/1996 |
| WO | WO 99/00927 | 1/1999 |

OTHER PUBLICATIONS

I.R. Johnson, et al., *On Suitable Codes for Frame Synchronisation in Packet Radio LANs*, Aug. 6, 1994, pp. 1421–1424.

G. D'Aria, et al., *Modeling and Stimulation of the Propagation Characteristics of the 900 MHz Narrowband–TDMA CEPT/GSM Mobile Radio*, 39th IEEE Vehicular Technology Conference, vol. II, May 1–3, 1989, pp. 631–639.

Shinya Otsuki, et al., *Performance of Modulation–Level– Controlled Adaptive Modulation Systems*, Electronics and Communications in Japan, Part 1., vol. 79, No. 7, 1996, pp. 81–93.

* cited by examiner

*Primary Examiner*—Chieh M. Fan
(74) *Attorney, Agent, or Firm*—Trop, Pruner & Hu, P.C.

(57) ABSTRACT

A transmitter outputs a radio signal formed from a first baseband signal incorporating a synchronization signal. The recipient obtains a second baseband signal from the received radio signal, detects the synchronization signal in a portion of the second baseband signal in order to compute synchronization parameters and/or parameters for estimating a radio transmission channel, and uses the computed parameters to demodulate another portion of the second baseband signal and extract the transmitted information from it. The synchronization signal contains a synchronization pattern selected by the transmitter on the basis of signalling information to be supplied to the second station. The receiver searches several patterns in the second baseband signal in order to obtain the signalling information depending on the detected pattern.

35 Claims, 4 Drawing Sheets

SIGNALLING METHOD IN A RADIO COMMUNICATION SYSTEM, AND TRANSMITTERS, RECEIVERS AND REPEATERS FOR IMPLEMENTING THE METHOD

BACKGROUND OF THE INVENTION

The present invention relates to the signalling methods used in radio communication networks.

Within a radio communication system, the information to be transmitted is often accompanied by a signal, known in advance to the transmitter and the receiver. Detection of this signal enables the receiver to synchronise with the transmitter (in time and/or frequency). In certain systems, this detection also enables parameters of the radio propagation channel between the transmitter and the receiver to be detected, whereby a coherent demodulation can be applied to the signal in order to extract the information transmitted.

To perform such detection, the receiver computes a time correlation function between the received signal and the known pattern of the transmitted signal. The time synchronisation is characterised by the position of the maximum of the modulus of this correlation function. The correlation function or the value of its maximum modulus provides an observation of the channel response and can be used to estimate this response. Performing correlation computations on differential signals avoids any problems due to possible carrier frequency discrepancies between the transmitter and the receiver, and makes it possible to evaluate these discrepancies in order to correct them.

To transmit signalling information, most systems use control channels on which this information is transmitted or broadcast.

Sometimes, some of the signalling information is supplied by reserving a portion of the signal transmitted on a dedicated communication channel (a few information bits). This method may be used in a "frame stealing" mechanism, enabling a logical signalling channel to be inserted in the radio resource supporting a traffic channel. This is used in the GSM system, in particular, to insert a fast associated control channel (FACCH) in a traffic channel. A disadvantage of this method is its adverse effect on the transmission rate available on the traffic channel due to the rate consumed by the reserved signal portion (overhead).

An object of the present invention is to propose a simple method of communicating signalling information in a system using synchronisation patterns between the transmitter and the receiver.

SUMMARY OF THE INVENTION

Accordingly, the invention proposes a signalling method in a radio communication system, wherein a first station transmits, toward at least one second station, a radio signal formed from a first baseband signal including a synchronisation signal containing at least one synchronisation pattern selected on the basis of signalling information to be supplied to the second station, wherein the second station obtains a second baseband signal from a received radio signal, detects the synchronisation signal in a portion of the second baseband signal to compute synchronisation parameters and/or parameters for estimating a radio transmission channel and uses the computed parameters to demodulate another portion of the second baseband signal and extract transmitted information therefrom, whereby the second station performs a search of several patterns in the second baseband signal to obtain said signalling information on the basis of the detected pattern.

The signalling information is sent at the same time as the synchronisation patterns, which enhances transmission capacity. Several synchronisation patterns are defined, and the sending of one of them provides the recipient with the signalling information. A method of this type is described in WO99/00927.

If the number of synchronisation patterns is $2^N$, the method enables N bits of signalling information to be transmitted whenever a pattern occurs in the signal. Accordingly, N bits of signalling information can be transmitted by means of N synchronisation patterns successively transmitted, each transmitted pattern being chosen from two predetermined patterns.

The different synchronisation patterns which may be used must have good auto-correlation and cross-correlation properties in order to limit the risks of detection errors. In other words, the auto-correlation function $AC_x(t)$ of each pattern x has a pronounced maximum for a zero time offset ($AC_x(0) >> AC_x(t)$ for $t \neq 0$ and the cross-correlation function $CC_{x,x'}(t)$ of two distinct patterns x, x' is lower than the auto-correlation of any one of these patterns by at least one order of magnitude ($CC_{x,x'}(t) << AC_x(0)$).

According to the invention, the first baseband signal is a complex signal and the synchronisation pattern is selected from a set of patterns containing a first pattern x, whose real and imaginary parts xr, xi have substantially identical auto-correlations and a cross-correlation substantially lower than said auto-correlations ($CC_{xr,xi}(t) << AC_{xr}(0) \approx AC_{xi}(0)$ for any t) and a second complex pattern x* which is conjugate to the first pattern.

The fact of having two synchronisation patterns where one is a conjugate complex of the other permits a simplification of the means needed at the receiver to extract the signalling information. Indeed, the computations of the elementary correlation functions of the real and imaginary parts of the second baseband signal with the real and imaginary parts of one of the two conjugate patterns, needed to evaluate the complex correlation of the second baseband signal with this pattern, can also be applied directly in the evaluation of the correlation with the other pattern. The auto- and cross-correlation properties of the real and imaginary parts of the synchronisation pattern ensure that this complex pattern and its conjugate will also have good auto- and cross-correlation properties.

If the first baseband signal is a complex signal, generated in response to the flow of digital symbols by a phase modulation such that the modulated phase is anti-symmetrical as a function of the symbols of the flow, a modality or a variant of the above-described embodiment consists in selecting a synchronisation sequence from a predetermined set containing at least one first sequence, giving rise after modulation to a synchronisation pattern whose real and imaginary parts have substantially identical auto-correlations and a cross-correlation substantially lower than said auto-correlations, and a second sequence opposite the first sequence.

This latter method is exactly the same as the first if the synchronisation patterns are transmitted in isolation.

If they are immediately preceded or followed by transmitted information symbols, the synchronisation patterns will not be exactly conjugate complexes of each other if the modulation and/or the propagation channel generates a memory effect causing inter-symbol interference.

Nevertheless, they are approximately conjugate complexes and the auto-correlation and cross-correlation properties remain satisfactory if the length of the synchronisation sequences is substantially longer than the memory of the channel and of the modulation. In this case, the receiver may conserve its simplicity by seeking conjugate patterns that are approximately equal to the synchronisation patterns inserted by the transmitter.

To implement the method, the invention proposes, as the "second station", a radio communication receiver comprising means for generating a complex baseband signal from a received radio signal, means for detecting a synchronisation signal including at least one synchronisation pattern in a portion of said baseband signal, for computing parameters for synchronising with a transmitter and/or parameters for estimating a radio transmission channel between the transmitter and the receiver, and means for demodulating another portion of said baseband signal with the aid of the computed parameters to extract transmitted information therefrom, the detection means being arranged to search a plurality of synchronisation patterns of a predetermined set of patterns in said baseband signal and obtain signalling information in response to the detection of a pattern of the set and as a function of the detected pattern, said set of patterns containing a first pattern whose real and imaginary parts have substantially identical auto-correlations and a cross-correlation substantially lower than said auto-correlations, and a second pattern which is a conjugate complex of the first pattern.

To implement the method, the invention proposes, as a "first station", a radio communication transmitter comprising means for transmitting, toward at least one receiver, a radio signal formed from a complex baseband signal including a synchronisation signal to enable the receiver to compute synchronisation parameters and/or parameters for estimating a radio transmission channel, means for selecting at least one synchronisation pattern from a predetermined set of patterns on the basis of signalling information to be supplied to the receiver, to include the selected pattern in the synchronisation signal, said set of patterns comprising a first pattern whose real and imaginary parts have substantially identical auto-correlations and a cross-correlation substantially lower than said auto-correlations, and a second pattern which is a complex conjugate of the first pattern.

Alternatively, the radio communication transmitter according to the invention comprises modulation means for generating a complex baseband signal in response to a flow of digital symbols, according to a phase modulation such that the modulated phase is anti-symmetrical as a function of the symbols of the flow, means for transmitting, toward at least one receiver, a radio signal formed from said baseband signal, and means for selecting a synchronisation sequence from a given set of sequences on the basis of signalling information to be supplied to the transmitter, the selected sequence being included in said flow of symbols to generate a synchronisation signal included in said baseband signal to enable the receiver to compute synchronisation parameters and/or parameters for estimating a radio transmission channel, said set of sequences containing at least one first sequence giving rise to a synchronisation pattern whose real and imaginary parts have substantially identical auto-correlations and a cross-correlation substantially lower than said auto-correlations, and a second sequence opposite the first sequence.

Another aspect of the present invention relates to a radio signal repeater comprising means for generating a first baseband signal from a received radio signal, means for detecting a synchronisation signal containing at least one synchronisation pattern generated in response to at least one sequence of synchronisation symbols in a portion of the first baseband signal, to compute parameters for synchronising with a transmitter and/or parameters for estimating a radio transmission channel from said transmitter, means for demodulating another portion of the first baseband signal with the aid of the computed parameters, to generate a flow of demodulated symbols, means for generating a second baseband signal from the flow of demodulated symbols and each sequence of synchronisation symbols detected, means for transmitting, toward at least one receiver, another radio signal formed from the second baseband signal with a frame structure corresponding to a frame structure of the received radio signal, and signalling means for transmitting to the receiver information indicating that the repeater is of the type outlined above, i.e. that it performs demodulation and remodulation of the repeated radio signals without controlling the frame structure of the signals.

These signalling means may operate by inserting signalling symbols at given locations reserved for this purpose in the flow of demodulated symbols. However, these signalling means preferably operate in accordance with the method outlined above, i.e. the means for generating the second baseband signal comprise means for transforming at least one detected sequence of synchronisation symbols, and a modulator to generate the second baseband signal in response to the flow of demodulated symbols with the transformed sequence. Alternatively, the means for generating the second baseband signal may comprise a modulator to generate an intermediate baseband signal in response to the flow of demodulated signals containing the detected sequence, and means for obtaining the second baseband signal by transforming the intermediate baseband signal within a period corresponding to a synchronisation pattern.

The signalling information coded by the received synchronisation pattern therefore provides the receiver with information as to whether such a repeater was or was not inserted in the transmission chain.

In other applications of the method, the transmitted signalling information may identify logical channels sharing the same radio resource or else modulation schemes applied to the transmitted signal frames.

DESCRIPTION OF PREFERRED EMBODIMENTS

Figure 1:
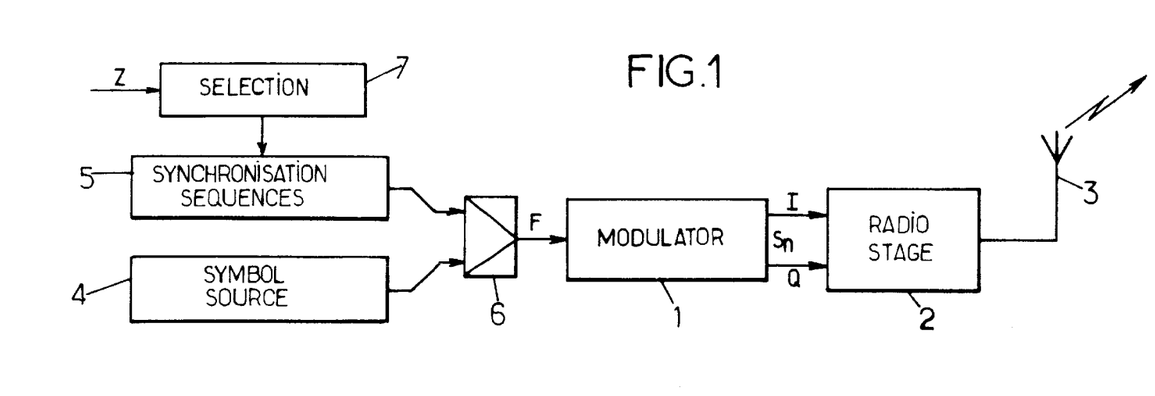
FIGS. 1 and 2 are respective block diagrams of a radio communication transmitter and receiver according to the invention.

The radio transmitter illustrated as an example in FIG. 1 comprises a digital modulator 1 generating a complex baseband signal $s_n$ from a flow F of discrete symbols. The complex baseband signal, sampled at a frequency $F_e$, has a real part (I) and an imaginary part (Q) applied to a radio stage 2 which forms the radio signal sent by the transmitter via the antenna 3. The radio stage 2 converts the real and imaginary parts of the complex digital signal $s_n$ into analog and uses them to modulate two carrier waves in quadrature of a same frequency. The resultant modulated waves are summed, filtered and amplified to form the transmitted radio signal.

The flow F is made up of discrete symbols, for example binary (±1) or M-ary (±1, ±3, . . . ±(M−1)), namely information symbols output by a source 4 and synchronisation signals output by a synchronisation sequence generator 5.

The symbol source 4 illustrated by a diagrammatic block in FIG. 1 issues coded information symbols which contain the traffic information (voice, data, image, . . . ), the nature and shape of which will depend on the radio communication system to which the transmitter belongs, as well as various items of signalling information used to operate the system. In a conventional manner, the source 4 may have a channel coder for one or more types of information, which adds redundancy to the symbols to be transmitted and/or introduces time interleaving in order to protect these symbols from transmission errors.

The sequence generator 5 outputs synchronisation symbols which the receiver uses as it detects them to obtain synchronisation information and/or estimate parameters of the radio propagation channel.

Each synchronisation sequence is constructed in a conventional manner, taking account of the resulting statistical properties of the synchronisation pattern in the complex signal $s_n$ after modulation.

These statistical properties may be expressed in various ways. For example, if $x=(x_0, X_1, \ldots, x_{L-1})$ denotes the pattern of L complex samples at the frequency $F_e$ generated by the modulator 1 in response to a sequence of symbols issued by the generator 5, the sequence will be constructed so that the auto-correlation function $$Ac_x(n) = \left| \sum_{k=0}^{L-1} x_{k+n} \cdot x_k^* \right|^2$$

(|.| denoting the modulus of a complex number) has a pronounced peak for a shift $n=0 (AC_x(0) >> AC_x(n)$ for $n \neq 0)$. In the expression of the auto-correlation function $AC_x(n)$ given above, $x_{k+n}$ for $n+k<0$ (respectively $n+k \geq L$) denotes the known value of the signal $s_{n+k}$ if the synchronisation sequence is not immediately preceded (respectively followed) by information symbols. If the synchronisation sequence is immediately preceded or followed by information symbols that are unknown a priori, $x_{k+n}$ for $n+k<0$ or $n+k \geq L$ denotes a random variable having the same probability density as the signal $s_n$ and the properties $AC_x(0) >> AC_x(n)$ for $n \neq 0$ is verified statistically, with the observation that the samples $x_0, \ldots, x_{K-1}$ may depend on information symbols if the modulation and the channel have a global memory of K samples with $K \geq 1$.

A multiplexer 6 assembles the flow F from the symbols output by the source 4 and the generator 5, in the form of frames in periodic succession and each of which comprises a given number of symbols.

Some frames may contain a relatively long synchronisation sequence (typically several tens of symbols) enabling the receiver to acquire an initial synchronisation with the transmitter. Other frames transmitted more frequently may contain shorter synchronisation sequences (for example less than 20 symbols), enabling the receiver to refine and track the synchronisation. If the receiver applies coherent demodulation, these known synchronisation sequences are also used to estimate the response of the propagation channel (impulse response or simply attenuation and phase shift if the memory of the modulation and the channel is small compared with the time of a symbol).

Figure 2:
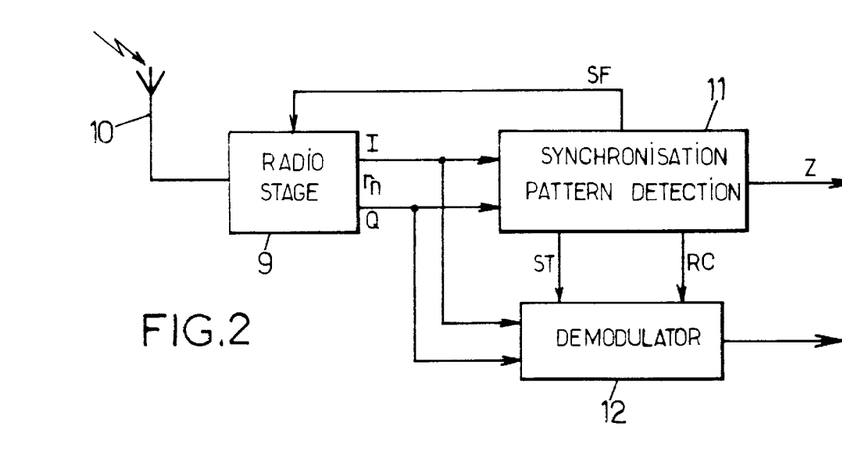

The receiver illustrated in FIG. 2 has a radio stage 9 which regenerates a complex baseband signal $r_n$ from the radio signal picked up by the antenna 10. The radio stage 9 essentially applies analog filtering, combines two quadrature waves at the carrier frequency, applies filtering to retain the baseband components of the combined signals and digitises the combined and filtered signals to produce the real part (I) and the imaginary part (Q) of the complex baseband signal $r_n$.

The receiver illustrated in FIG. 2 has a radio stage 8 which regenerates a complex baseband signal $r_n$ from the radio signal picked up by the antenna 10. The radio stage 9 essentially applies analog filtering, combines two quadrature waves at the carrier frequency, applies filtering to retain the baseband components of the combined signals and digitises the combined and filtered signals to produce the real part (I) and the imaginary part (Q) of the complex baseband signal $r_n$.

This complex signal $r_n$ is processed firstly by a module 11 which detects synchronisation patterns and secondly by a demodulator 12 used to estimate the information symbols supplied by the source 4 of the transmitter.

In a conventional manner, the module 11 uses the presence of the synchronisation sequences in the transmitted signal to extract time synchronisation symbols ST which can be used by the demodulator 12 and optionally frequency synchronisation parameters SF applied to the radio stage 9 of the receiver in order to adjust the frequency of its oscillator to tune to the carrier frequency used by the transmitter.

By way of example, the time synchronisation information ST may indicate that the shift n for which the normalized correlation function:

$$IC_{rx}(n) = \frac{\left| \sum_{k=0}^{L-1} r_{k+n} \cdot x_k^* \right|^2}{\left( \sum_{k=0}^{L-1} |r_{k+n}|^2 \right) \cdot \left( \sum_{k=0}^{L-1} |x_k|^2 \right)} \quad (1)$$

is maximum. In the case of continuous phase modulation (CPM), the parameter SF may represent a frequency discrepancy to be corrected in the radio stage 9, given for example by $$\frac{F_e}{2\pi} \text{Arg} \left( \sum_{n=0}^{L-1} r_n^* \cdot r_{n+1} \right),$$

where Arg(.) denotes the argument of a complex number. It should be pointed out that numerous other synchronisation methods may be used by the detection module 11. In particular, the frequency variance to be corrected may be evaluated more finely by methods using a frequency transform (see U.S. patent application Ser. No. 09/654,800 filed on Sep. 5, 2000).

For the value of n which maximises the function $IC_{r,x}(n)$ or in the vicinity of this value, the complex correlation $$\Gamma_n = \sum_{k=0}^{L-1} r_{k+n} \cdot x_k^*$$

provides observations which, in a known manner, also enable the propagation channel between the transmitter and the receiver to be estimated. If the demodulator 12 operates coherent demodulation, it receives the corresponding estimations RC from the detection module 11.

The synchronisation information ST locks the demodulator 12 on the transmitted time structure of the frames and samples, enabling it to estimate the symbols output by the source 4 in periods located between the synchronisation sequences, and the channel estimation RC enables it to apply coherent demodulation.

Figure 4:
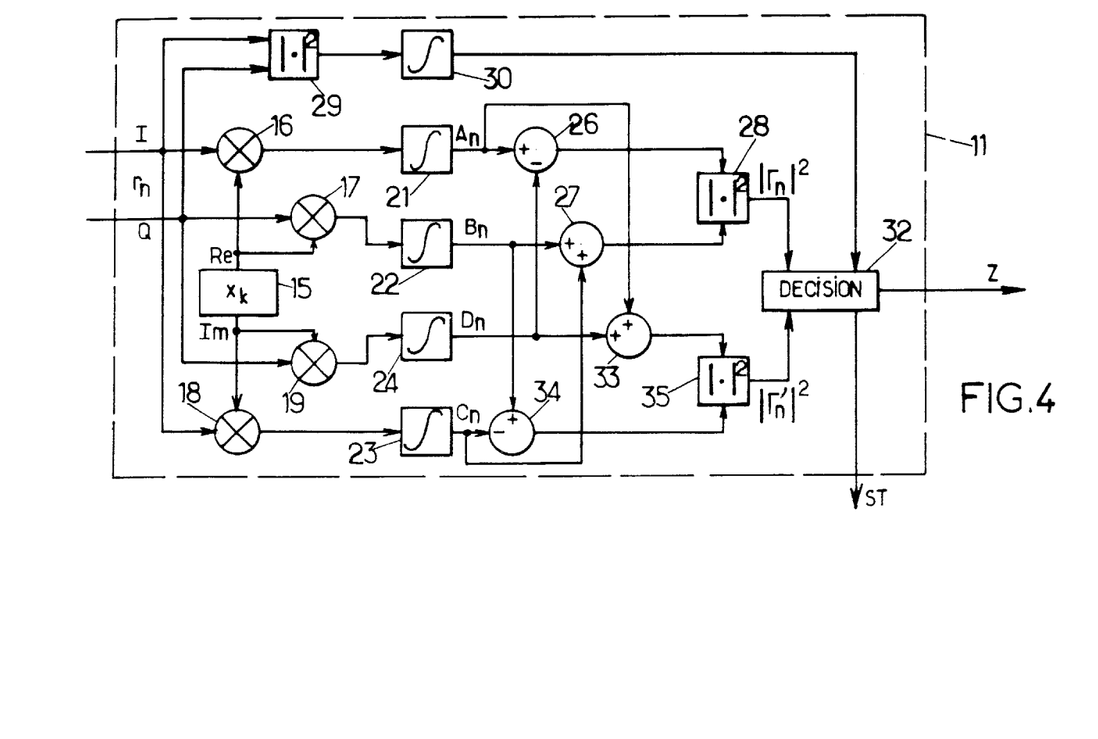
FIG. 4 is block diagram of a module for detecting synchronisation patterns which may be used in the receiver illustrated in FIG. 2.

FIG. 4 is a schematic illustration of an example of an embodiment of the module 11 used to detect synchronisation patterns. The complex samples $x_k$ of the synchronisation pattern x are stored in a memory 15 of the module 11 ($0 \leq k < L$).

The numerator of the correlation function $IC_{r,x}(n)$ as defined in equation (1) is given by $|\Gamma_n|^2 = (A_n - D_n)^2 + (B_n + C_n)^2$, where:

$$A_n = \sum_{k=0}^{L-1} \operatorname{Re}(r_{k+n}).$$

$\operatorname{Re}(x_k)$ is the correlation, calculated by a multiplier 16 and an accumulator 21 integrating on L samples, between the real part $\operatorname{Re}(r_n)$ of the baseband signal and the real part $\operatorname{Re}(x_k)$ of the synchronisation pattern, stored in the memory 15;

$$B_n = \sum_{k=0}^{L-1} \operatorname{Im}(r_{k+n}).$$

$\operatorname{Re}(x_k)$ is the correlation between the imaginary part $\operatorname{Im}(r_n)$ of the baseband signal and $\operatorname{Re}(x_k)$ (multiplier 17 and accumulator 22);

$$C_n = \sum_{k=0}^{L-1} \operatorname{Re}(r_{k+n}).$$

$\operatorname{Im}(x_k)$ is the correlation between $\operatorname{Re}(r_n)$ and the imaginary part $\operatorname{Im}(x_k)$ of the pattern, stored in the memory 15 (multiplier 18 and accumulator 23); and $$D_n = \sum_{k=0}^{L-1} \operatorname{Im}(r_{k+n}).$$

$\operatorname{Im}(x_k)$ is the correlation between $\operatorname{Im}(r_n)$ and $\operatorname{Im}(x_k)$ (multiplier 19 and accumulator 24). The numerator $|\Gamma_n|^2$ of the correlation function is applied by the unit 28 which sums the squares of the quantities $A_n - D_n$ and $B_n + C_n$ respectively provided by the subtractor 26 and the adder 27.

The first term of the denominator in equation (1), the second term of which is constant and therefore does not need to be computed, is obtained by a unit 29 which computes the square modulus of the received complex signal $r_{k+n}$ on the window in question and by the accumulator 30 which produces the sum of the square moduli on a window of L samples.

The detection module 11 has a decision unit 32 which determines the maximum of the ratio of variables respectively applied by the units 28 and 30 and which decides that the receiver is synchronised when this maximum exceeds a given threshold. In this case, the time position of the maximum is coded in the synchronisation information ST applied to the demodulator. If the latter is applying coherent demodulation, the complex number $\Gamma_n = (A_n - D_n) + j \cdot (B_n + D_n)$ may be used to estimate the propagation channel.

The transmitter proposed by the invention, illustrated in FIG. 1, has a control unit 7 which selects the synchronisation sequence output by the generator 5 on the basis of signalling information Z to be supplied to the receiver. The generator 5 is therefore capable of producing several different synchronisation sequences, the selected sequence being representative of the information Z.

These different sequences must of course have good cross-correlation properties. Secondly, their respective auto-correlations must be of the same order so that they have similar detection probabilities, i.e. $AC_x(0) \approx AC_{x'}(0)$ for the synchronisation patterns x,x' respectively generated by the modulator 1 in response to two of these sequences. Good cross-correlation properties mean, for example, that the cross-correlation function $$CC_{x,x'}(n) = \left| \sum_{k=0}^{L-1} x_{k+n} \cdot x_k^* \right|^2$$

is lower than the auto-correlations $AC_x(0)$ and $AC_{x'}(0)$ by at least one order of magnitude.

In order to identify the synchronisation pattern present in the received signal $r_n$ and hence identify the transmitted signalling information Z, the means for detecting synchronisation patterns may incorporate several modules such as that described above, operating in parallel on the basis of different possible sequences. Detection of a sequence by one of these modules will then enable the synchronisation to be achieved and the information Z to be extracted.

A known way of generating sequences having the properties described above is to use error correction codes. This will reduce the complexity of detection processing due to the algebraic structure of these codes. For example, a first order Reed-Muller code may be used, which, because of its regular structure, will reduce the computing power needed in the receiver. Several sequences which may be used by the transmitter are derived from an initial synchronisation sequence by multiplying the initial sequence by several codewords belonging to the relevant correction code. However, this method can only be applied in the case of linear signals and binary symbols.

Figure 3:
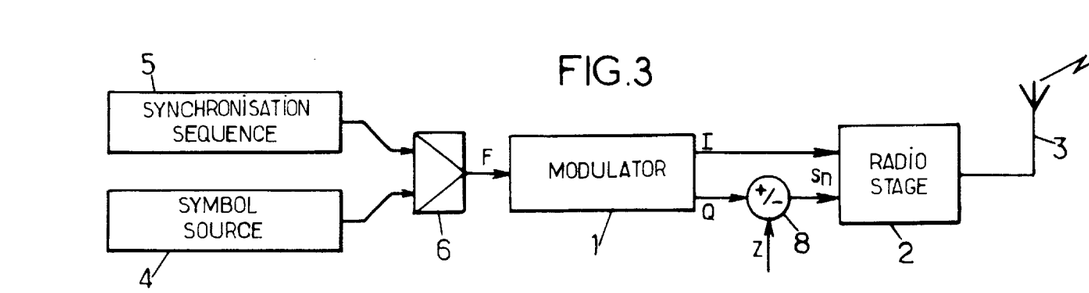
FIG. 3 is a block diagram of another embodiment of the transmitter.

In the embodiment of the transmitter illustrated as an example in FIG. 3, the generator 5 outputs a single synchronisation sequence which gives rise to a pattern x at the output of the modulator 1. This pattern $x = xr + j \cdot xi$ has real and imaginary parts xr, xi, whose auto-correlations are substantially identical and whose cross-correlation is substantially lower than said auto-correlations ($CC_{xr,xi}(n) \ll AC_{xr}(0) \approx AC_{xi}(0)$ for any n). A unit 8 selectively inverts the sign of only the imaginary part xi (or in an equivalent manner of only the real part xr) of the pattern x to form the complex baseband signal $s_n$ in the regions corresponding to the pattern x. This sign inversion will occur only if an information signalling bit Z has a given value (hereafter Z=1), the baseband signal $s_n$ being obtained directly at the output of the modulator when Z=0.

The synchronisation pattern inserted in the signal $s_n$ is then either the pattern x or its conjugate pattern $x^* = xi - j \cdot xr$.

Taking account of the correlation properties of the real sequences xr and xi, the two complex patterns x and x* have satisfactory cross-correlation properties.

Either one of these two patterns x, x* may be detected by the module 11 illustrated in FIG. 4, in which elements 33-35 represent a negligible additional complexity. The adder 33 computes the sum $A_n+D_n$ whilst the subtractor 34 computes the difference $B_n-C_n$. The unit 35 then computes the value $|\Gamma'_n|^2=(A_n+D_n)^2+(B_n-C_n)^2$ which represents the numerator of the correlation function $IC_{r,x^*}(n)$ in accordance with equation (1). The denominators of the correlation functions $IC_{r,x}(n)$ and $IC_{r,x^*}(n)$, on the other hand, are identical for the two conjugate patterns x, x*. Consequently, the decision unit 32 merely has to choose the larger of the two variables $|\Gamma_n|^2$, $|\Gamma'_n|^2$ issued by the units 28 and 35 when examining the synchronisation criterion. If this criterion is satisfied, the synchronisation is achieved and the unit 32 will deliver the information bit Z corresponding to that of the patterns for which the decision variable is the higher (Z=0 if $|\Gamma_n|^2>|\Gamma'_n|^2$ and Z=1 if $|\Gamma_n|^2<|\Gamma'_n|^2$).

The method outlined above may be generalised for transmitting a number N>1 of signalling bits Z. If the synchronisation pattern x is sub-divided into N successive sub-patterns, contiguous or not, N bits can be transmitted by selectively replacing each of the sub-patterns with its conjugate pattern.

If the patterns or sub-patterns are transmitted continuously, it is desirable to guarantee the continuity of the modulated signal $s_n$. The same detection module 11 may be used for this purpose without the synchronisation patterns or sub-patterns being exact conjugates one of the other. This is the case in particular for modulations with a constant envelope having a memory effect, for example GMSK (Gaussian Minimum Shift Keying). This may easily be applied if the duration of the memory effect is small relative to the duration of the synchronisation pattern or sub-pattern.

In the case of continuous phase modulation where the phase varies linearly as a function of the symbols of the flow F, the control unit 7 (FIG. 1) may then issue a command to the generator 5 to output either a given synchronisation sequence or the opposite sequence, depending on a signalling bit Z. The phase modulation being linear (or more generally anti-symmetrical) as a function of the symbols, replacing a sequence with the opposite sequence is tantamount to replacing the corresponding synchronisation pattern x with the conjugate pattern x*, except at the edges of the synchronisation pattern, over a period corresponding to the modulation memory.

Accordingly, if the length L of the synchronisation patterns is long compared with the length K of the modulation memory, the two patterns obtained are almost conjugate of each other and have satisfactory correlation properties.

For the shorter sequences, generating synchronisation patterns whose length L is of the same order of magnitude as the memory K of the modulation, a transmitter of the type illustrated in FIG. 3 may be used. In this case, in order to avoid phase discontinuities, the synchronisation sequence may be preceded and followed by known symbols in the flow F over a period corresponding to the modulation memory. The disadvantage of this is that it lengthens the time needed by the synchronisation sequences. In order to eliminate this drawback, it is possible to select several sequences which will generate the best statistical properties once the synchronisation patterns have been modulated and to arrange the transmitter as illustrated in FIG. 1. In this latter case, the means used to detect the synchronisation patterns in the receiver must perform several computations of correlations in parallel, which is not too demanding in terms of computing resources given that, in theory, the synchronisation sequences are short.

The signalling method described above may be used in a radio communication system in which mobile terminals are able to communicate directly with one another in direct mode and/or via repeaters. By way of example, the repeaters may be of three types:

type 1: a simple repeater which does not perform demodulation of received signals. Such repeater may essentially consist of an amplifier and a frequency transposing device to retransmit the radio signals picked up;

type 2: a repeater with clock regeneration which performs demodulation of the received signal and remodulation of the flow of demodulated digital symbols to form the radio signal retransmitted on a transposed frequency. The flow of demodulated symbols is not subjected to channel decoding to correct any transmission errors which might have affected the received signal;

type 3: a corrector repeater which performs demodulation of the received signal, channel decoding (de-interleaving, correction decoding), channel recoding from the decoded information and remodulation to produce the radio signal retransmitted on a transposed frequency.

Repeaters of types 1 and 2 operate in slave (or asymmetrical) mode. The transmitter generating the radio signal is the master, particularly since it sets the frame structure of this signal, and the repeater copies this frame structure in the signal repeated on another frequency, with a processing delay in the case of a repeater of type 2 because of the demodulation and remodulation operations performed.

The repeater of type 3 is set up to operate in master (or symmetrical) mode, whereby the correction repeater controls the frame structure on the one hand toward the transmitter terminal and on the other hand toward the receiver terminal. This repeater is considerably more complex than those of types 1 and 2. In particular, the frame structure of the repeated signal is generated separately from that of the received signal. This is due to the relatively long processing delay imposed by the correction repeater, in particular because of the signal interleaving used to improve the efficiency of the correction decoder. In view of the periods typically used in the radio frames (several tens of milliseconds), this processing delay does not allow the frame structure of the received signal to be re-used).

The transmitter and receiver terminals of a system organised as described above may be used to implement the present invention to supply a destination receiver terminal with signalling information indicating whether or not the radio signal was repeated by a repeater of type 2. This information may be provided in particular by means of the long synchronisation pattern initially sent by the transmitter to achieve the first synchronisation of the receiver.

In order to illustrate how this information is used by the receiver, we will look at an example in which the signals are transmitted using a super-frame structure generated by the master station, each super-frame comprising periods of 320 ms for sending traffic signals from the transmitter to the receiver, alternating with periods of 40 ms seconds during which the signalling signals are sent, every second 40 ms period being dedicated to forward signalling, i.e. from the transmitter to the receiver, and the other 40 ms periods being dedicated to backward signalling, i.e. from the receiver to the transmitter. The receiver has no difficulty in sending backward signalling if the radio signal is received in direct mode or repeated mode with a repeater of type 1: with a 5 ms interval for switching frequency at the start and end of the 40 ms period, the receiver returns the signalling in alignment with the frame structure imposed by the transmitter. There is no difficulty in the case of a repeater of type 3 either, since it is the correction repeater which imposes the frame structure for communicating with the receiver.

The case of the repeater of type 2 is more difficult because the modulation and demodulation operations performed in the two directions take time (typically about 10 ms for each direction) so that the transmitter might miss a part of the signalling returned to it since it risks receiving the latter outside the 40 ms period which it set and at the end of which it still has to reserve about 5 ms in order to switch its frequency.

In order to ensure orderly transmission of the backward signalling signals if a repeater of type 2 is on the path, it is of advantage to use a systematic code for channel coding, preferably with a high rate. It is therefore judicious to use a systematic block code. However, this block code will not be optimum for the transmission of the backward signalling in the case of direct mode or in situations where the signals are relayed by a repeater of type 1 or 3. In this case, it is preferable to use a convolutional code, of a lower rate (for example ½), with a soft decoding to enhance the performance.

Accordingly, two different transmission formats may be provided for transmitting the backward signalling. In order to know what format to use, the receiver must have identified the presence of a repeater of type 2, if any, in the transmission chain of the signals it has received, hence the use of the above-mentioned signalling information.

The signals prepared by the original transmitter, or at least some of them, contain synchronisation patterns reflecting synchronisation sequences inserted in the flow of digital symbols. These synchronisation patterns are not modified by repeaters of type 1 or 3. However, one or more of these patterns (in particular the initial synchronisation pattern) are modified by the repeater of type 2, which means that the receiver is able to detect the presence of this repeater of type 2 once it detects the modified synchronisation pattern in place of the original synchronisation pattern.

Figure 5:
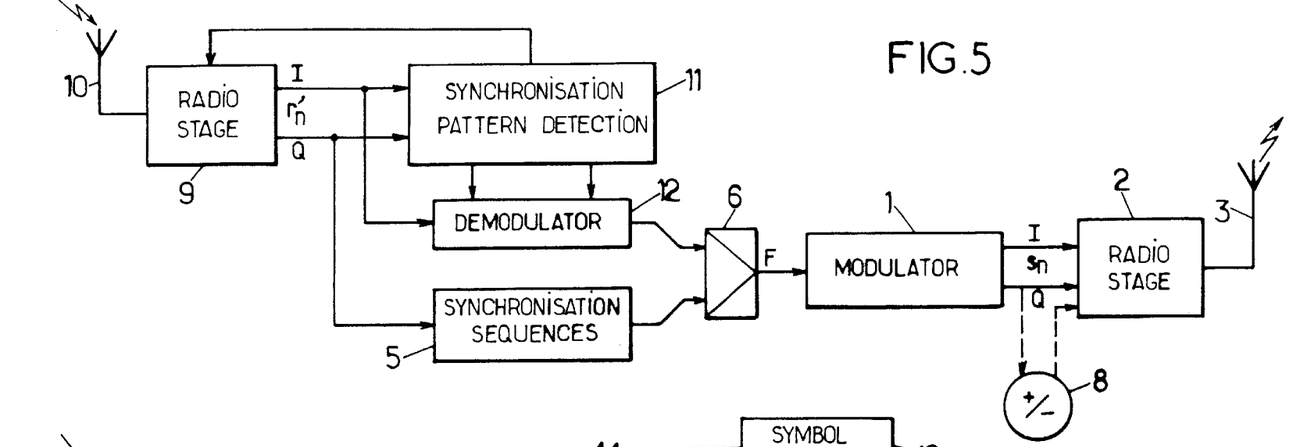
FIGS. 5 and 6 are respective block diagrams of a repeater according to the invention and a corresponding receiver terminal.
Figure 6:
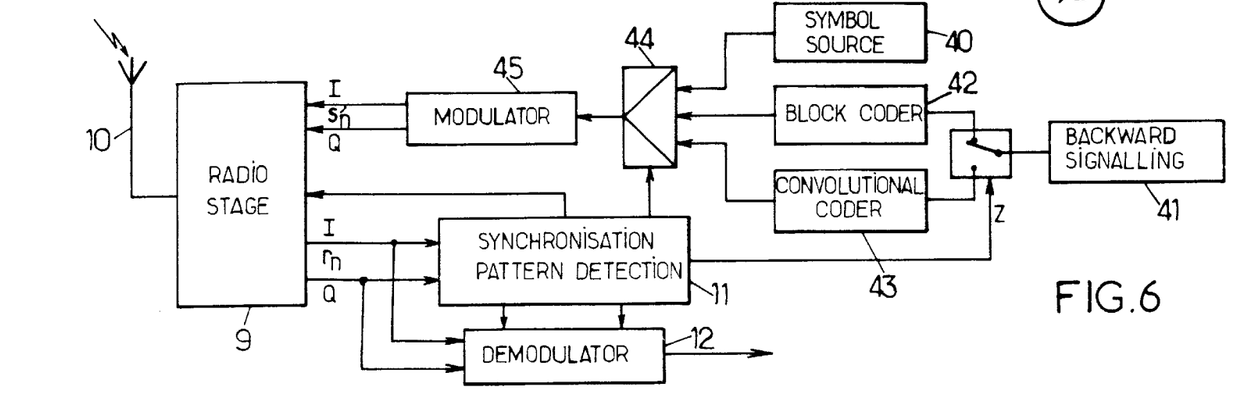

Block diagrams of such a repeater of type 2 and a corresponding receiver terminal are illustrated in FIGS. 5 and 6, respectively, the same reference numerals being used as those used above to denote elements of the same nature.

The receiving part of the repeater has a radio stage 9 which generates a baseband signal $r'_n$ from the radio signal picked up by the antenna 10 from the original transmitter. The module 11 detects the (original) synchronisation pattern to supply the parameters needed by the demodulator 12 and optionally by the radio stage 9. The demodulator 12 generates a flow of demodulated symbols from the portions of the baseband signal $r'_n$ located outside the synchronisation patterns.

This demodulator 12 replaces the symbol source 4 illustrated in the transmitter diagram of the FIG. 1.

The transmitting part of the repeater of FIG. 5 further has a symbol sequence generator 5, which generates the modified synchronisation sequence characteristic of the repeater of type 2, a multiplexer 6 which reassembles the flow of symbols F with the modified sequence, a modulator 1 and a radio stage 2 feeding the antenna 3.

In an alternative embodiment, the generator 5 produces the same sequence as the original transmitter (where this sequence is obtained by demodulating the signal $r'_n$) and the change in the synchronisation pattern is carried out by changing the sign of the imaginary part only (or the real part only) of the baseband signal $s_n$ applied to the radio stage 2, as indicated by block 8 shown in broken lines in FIG. 5. In this latter case, the repeater behaves like a transmitter of the type illustrated in FIG. 3, the information Z indicating whether it is of type 2 or of type 1 or 3.

FIG. 6 illustrates a terminal incorporating a receiver similar to that of FIG. 2, the detection module 11 being capable of extracting the information bit Z defined by the synchronisation sequence which it has detected. This module 11 is of the type illustrated in FIG. 4, for example. For the transmitting part, the station has a symbol source 40, diagrammatically illustrated on a single block in FIG. 6 and which generates the symbols to be modulated with the exception of those relating to backward signalling. These latter symbols are generated from a signalling information source 41 by redundant coding.

Depending on the bit Z extracted by the detection module 11, this redundant coding is applied either by a systematic block coder 42 (if Z indicates detection of the modified synchronisation pattern) or by a convolutional coder 43 (if Z indicates detection of the original pattern). A multiplexer 44 inserts the symbols issued by the coder 42 or 43 in those output by the source 40, complying with the frame structure with which the detection module 11 has acquired the synchronisation. The modulator 45 generates a baseband signal $s'_n$ from the flow of symbols generated by the multiplexer 44 and this signal $s'_n$ is processed by the transmitting part of the radio stage 9, which forms the radio signal retransmitted by the terminal.

Figures 7, 8:
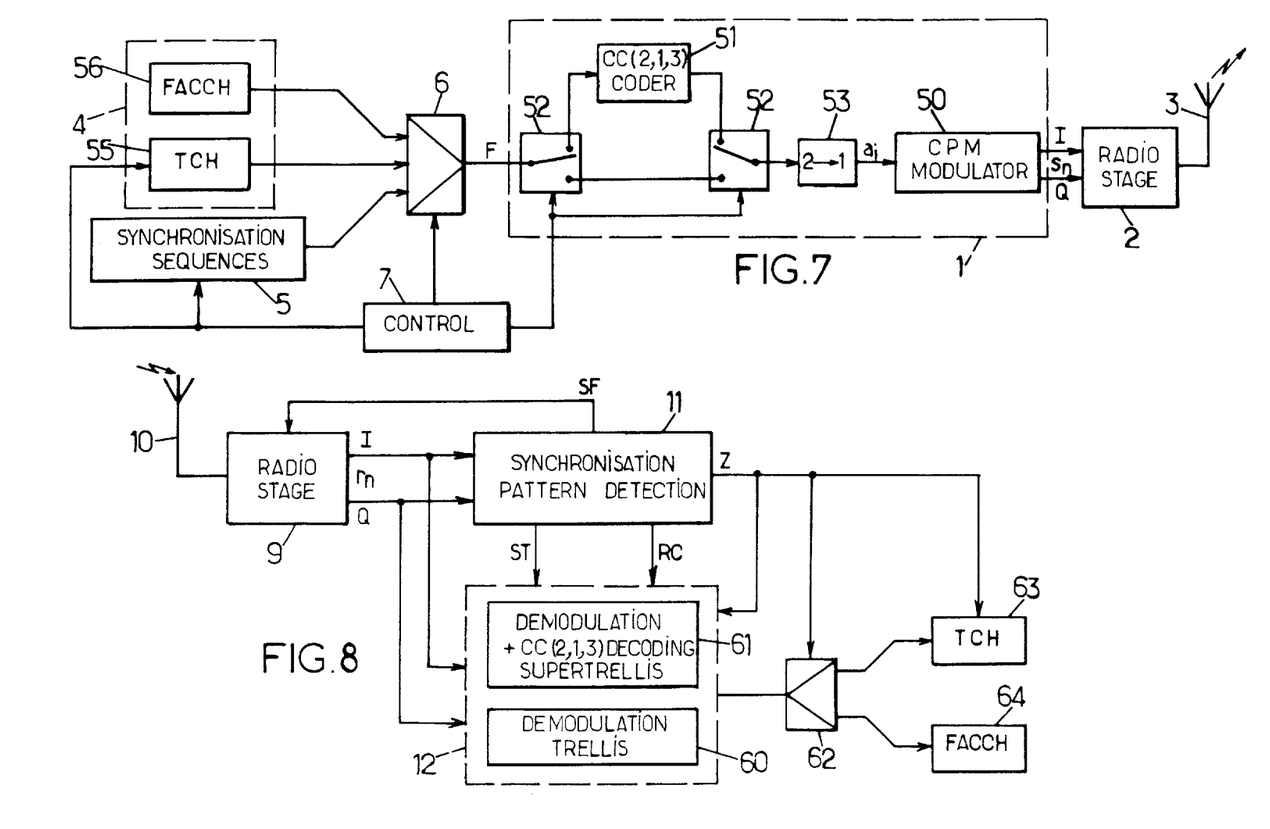
FIGS. 7 and 8 are respective block diagrams of a radio communication transmitter and receiver according to another embodiment of the invention.

In the embodiment illustrated in FIGS. 7 and 8, the signalling information Z communicated to the receiver by means of the synchronisation patterns is used firstly to multiplex the logical channels on the same physical transmission channel and secondly to identify the modulation scheme used to generate the radio signals.

The combined modulator 1 of the transmitter illustrated in FIG. 7 is arranged to use one of two modulation schemes.

It comprises a continuous phase modulator (CPM) 50, which, depending on the M-ary symbols $a_i$ fed at the rate 1/T, produces for $p \cdot T \leq t < (p+1) \cdot T$ a waveform $$S(t) = \exp\left[2j\pi h \cdot \left(\sum_{i=-\infty}^{p} a_i \cdot q(t - i \cdot T)\right)\right]$$

where h is the modulation index and q(t) the phase pulse of the modulation, with q(t)=1 for $t \geq K \cdot T$, K being the memory of the modulation expressed as a number of M-ary symbols. The waveform S(t) is sampled at the frequency $F_e$ to shape the baseband signal $s_n$. In the example of FIG. 7, the symbols of the flow F are binary at values 0 or 1 and converted into quaternary symbols $a_i$ with values ±1 and ±3 by a unit 53 at the input of the CPM modulator 50.

The modulator 1 further has a redundancy coder 51 operating on the basis of the convolutional code CC(2,1,3), for example. This coder 51 is activated upstream of the CPM modulator 50 only if switches 52 are positioned accordingly by the selection and control unit 7. The dual mode modulator 1 processes the flow of symbols F output by the multiplexer 6. When the convolutional coder 51 is in service, the dual mode modulator 1 applies a coded modulation (see G. Ungerboeck "Channel Coding with Multilevel/Phase Signals", IEEE Transactions on Information Theory, Vol. IT-28, No. 1, January 1982). When the convolutional coder 51 is not in service, the modulation is not coded and the rate of the symbols in the flow F is doubled. In principle, coded modulation secures better transmission quality but at a lower transmission rate (see EP-A-0 896 443).

In the example illustrated in FIG. 7, the symbol source 4 has a unit 55 transmitting on a traffic channel (TCH), with a symbol flow rate selected by the control unit 7 to comply with the type of modulation applied. The source 4 also has a unit 56 defining a fast associated control channel (FACCH), on which coded modulation is always applied. The distinction between the TCH and FACCH logical channels is performed by the control unit 7 which controls the multiplexer 6.

The synchronisation sequence generator 5 is arranged to insert two synchronisation patterns per burst of the baseband signal $s_n$. The corresponding sequences are determined beforehand as indicated hereabove, by minimising the cross-correlations between the patterns which they generate in the complex baseband signal $s_n$.

TABLE I

| Logical ch./modulation | 1st sequence | 2nd sequence |
|---|---|---|
| FACCH/coded | | |
| Binary sequence (F) | 0 1 0 1 0 1 | 0 1 0 0 0 1 |
| Quaternary sequence ($a_i$) | −3 −1 −3 +3 −3 +3 | −3 −1 −3 −1 −3 −1 |
| TCH/coded | | |
| Binary sequence (F) | 0 0 1 0 0 1 | 1 1 1 0 1 1 |
| Quaternary sequence ($a_i$) | −3 −3 +1 −3 −1 +1 | −1 −1 +3 −1 −1 +1 |
| TCH/non-coded | | |
| Binary sequence (F) | 1 0 0 0 0 1 1 0 1 0 1 0 | 0 1 0 1 0 1 1 0 1 1 0 1 |
| Quaternary sequence ($a_i$) | −1 −3 +1 −1 −1 −1 | +1 +1 +1 −1 +3 +1 |

By way of example, if the CPM modulator 50 applies quaternary modulation with an index 1/3 described as an example in EP-A-0 936 784, the patterns may be generated from the sequences of symbols given in Table 1, the first sequence of each block being preceded by the symbols $a_i$ set to zero (constant phase) and followed by the information symbols that are unknown a priori, whereas the second sequence of each frame is preceded by the symbols that are unknown a priori and followed by the symbols $a_i$ set to zero.

In the receiver illustrated in FIG. 8, the means 11 for detecting synchronisation patterns conduct a search in parallel of the patterns associated with the above sequences. Depending on the sequence identified (signalling information Z), the detection means 11 issue a command to:

the demodulator 12, which may operate in a conventional manner using the Viterbi algorithm, with a simple demodulation trellis 60 where modulation on the TCH channel is non-coded or with a supertrellis 61 integrating the modulation and convolutional coding states in order to obtain the gain of the coded modulation on the TCH or FACCH;

the demultiplexer 62 which directs the flow of symbols output by the demodulator 12 either to the units 63 processing the traffic channel TCH or to the units 64 processing the signalling channel FACCH;

the units 63 processing the traffic channel TCH to indicate what the transmission rate is on this channel.

The radio communication system incorporating the transmitters illustrated in FIG. 7 and the receivers illustrated in FIG. 8 have the advantage of enabling an associated signalling channel to be inserted in a traffic channel by a "frame stealing" type of mechanism without adding overhead, i.e. without specifically reserving information symbols in the block transmitted in each burst to indicate the type of logical channel. It is also of advantage to be able to select frame by frame the modulation scheme used, which enables the instantaneous flow rate on the channel to be dynamically adapted.

It should be pointed out that the signalling information likely to be transmitted between transmitters and receivers operating as explained above with reference to FIGS. 1 to 4 may be very varied in nature, the examples of applications given with reference to FIGS. 5-6 and 7-8 not being restrictive.

In an alternative to the above-described embodiments, the synchronisation patterns are detected on the basis of a differential baseband signal, corresponding to $r_n \cdot r_{n-1}^*$. In this case, the desired correlation properties must of course be respected with regard to the differential synchronisation patterns $x_k \cdot x_{k-1}^*$.

What is claimed is:

1. A signalling method in a radio communication system, comprising the steps of:

transmitting from a first station, toward at least one second station, a radio signal formed from a first complex baseband signal generated in response to a flow of digital symbols according to a phase modulation such that the modulated phase is anti-symmetrical as a function of the symbols of the flow, wherein the first baseband signal contains a synchronisation signal generated in response to at least one synchronisation sequence contained in said flow of symbols and selected from a predetermined set on the basis of signalling information to be supplied to the second station;

obtaining at the second station a second baseband signal from a received radio signal;

detecting the synchronisation signal in a portion of the second baseband signal to compute synchronisation parameters and/or parameters for estimating a radio transmission channel, wherein the step of detecting the synchronisation signal comprises detecting a synchronisation pattern by performing a search of several patterns in the second baseband signal;

using the computed parameters to demodulate another portion of the second baseband signal and extract transmitted information therefrom; and obtaining said signalling information on the basis of the detected synchronisation pattern, wherein the predetermined set of synchronisation sequences contains at least one first sequence, giving rise to a synchronsation pattern whose real and imaginary parts have substantially identical auto-correlations and a cross-correlation substantially lower than said auto-correlations, and a second sequence opposite the first sequence.

2. A method as claimed in claim 1, wherein the second station memorises real and imaginary parts of a first synchronisation pattern corresponding to a sequence of a pair of opposite sequences of the predetermined set, and the step of detecting the synchronisation signal comprises the steps of:

computing a first correlation between the real part of the second baseband signal and the real part of the first synchronisation pattern;

computing a second correlation between the imaginary part of the second baseband signal and the imaginary part of the first synchronisation pattern;

computing a third correlation between the real part of the second baseband signal and the imaginary part of the first synchronisation pattern;

computing a fourth correlation between the imaginary part of the second baseband signal and the real part of the first synchronisation pattern;

computing a first decision variable given by the square of the difference between the first and second correlations plus the square of the sum of the third and fourth correlations;

computing a second decision variable given by the square of the sum of the first and second correlations plus the square of the difference between the third and fourth correlations and when a detection criterion is verified by at least one of the first and second decision variables, detecting the first synchronisation pattern if the first decision variable is higher than the second decision variable, detecting a second synchronisation pattern, corresponding to the sequence opposite that to which the first synchronisation pattern corresponds if the second decision variable is higher than the first decision variable, and obtaining a signalling information bit whose value differs depending on whether the first or second pattern is detected.

3. A method as claimed in claim 1, wherein the first station is a radio signal repeater and said signalling information contains information depending on types of processing applied to the radio signals by said repeater.

4. A method as claimed in claim 3, wherein the signalling information differs depending on whether or not the repeater is of a type which demodulates and remodulates repeated signals without controlling a frame structure of the signals, and wherein the second station returns signals carrying signalling to the repeater in a first format if the signalling information obtained does not indicate that the first station is a repeater of said type and in a second format different from the first format if the signalling information obtained indicates that the first station is a repeater of said type.

5. A method as claimed in claim 4, wherein the repeater applies a given transformation to the synchronisation pattern in the repeated signals only if it is a repeater of said type.

6. A method as claimed in claim 5, wherein said transformation consists in replacing, in the demodulated signals, at least a first sequence of the set, detected by the repeater, by a second, different sequence of the set.

7. A method as claimed in claim 1, wherein the second baseband signal obtained by the second station is a differential signal.

8. A method as claimed in claim 1, wherein the first baseband signal comprises successive frames which may belong to at least two different logical channels, and wherein each frame of the first baseband signal contains at least one synchronisation pattern selected by the first station on the basis of signalling information identifying the logical channel to which said frame belongs.

9. A method as claimed in claim 1, wherein the first baseband signal comprises successive frames, wherein each frame of the first baseband signal is generated in response to a flow of digital symbols according to a modulation selected from several possible modulations, and wherein each frame of the first baseband signal contains at least one synchronisation pattern selected by the first station on the basis of signalling information identifying the modulation according to which said frame is generated.

10. A method as claimed in claim 9 wherein the possible modulations comprise a coded modulation and a non-coded modulation.

11. A signalling method in a radio communication system, comprising the steps of:

transmitting from a first station toward at least one second station, a radio signal formed from a first complex baseband signal containing a synchronisation signal including at least one synchronisation pattern selected on the basis of signalling information to be supplied to the second station;

obtaining at the second station a second baseband signal from a received radio signal;

detecting the synchronisation pattern in a portion of the second baseband signal to compute synchronisation parameters and/or parameters for estimating a radio transmission channel by performing a search of several patterns in the second baseband signal;

using the computed parameters to demodulate another portion of the second baseband signal and extract transmitted information therefrom; and obtaining said signalling information on the basis of the detected synchronisation pattern, wherein said synchronisation pattern is selected from a set of patterns containing a first pattern whose real and imaginary parts have substantially identical auto-correlations and a cross-correlation substantially lower than said auto-correlations, and a second pattern which is a conjugate complex of the first pattern.

12. A method as claimed in claim 11, wherein the step of detecting the synchronisation pattern comprises the steps of:

computing a first correlation between the real part of the second baseband signal and the real part of the first pattern;

computing a second correlation between the imaginary part of the second baseband signal and the imaginary part of the first pattern;

computing a third correlation between the real part of the second baseband signal and the imaginary part of the first pattern;

computing a fourth correlation between the imaginary part of the second baseband signal and the real part of the first pattern;

computing a first decision variable given by the square of the difference between the first and second correlations plus the square of the sum of the third and fourth correlations;

computing a second decision variable given by the square of the sum of the first and second correlations plus the square of the difference between the third and fourth correlations;

when a detection criterion is verified by at least one of the first and second decision variables, detecting the first pattern if the first decision variable is higher than the second decision variable, detecting the second pattern if the second decision variable is higher than the first decision variable and obtaining a signalling information bit whose value differs depending on whether the first or second pattern is detected.

13. A method as claimed in claim 11, wherein the first station is a radio signal repeater and said signalling information contains information depending on types of processing applied to the radio signals by said repeater.

14. A method as claimed in claim 13, wherein the signalling information differs depending on whether or not the repeater is of a type which demodulates and remodulates repeated signals without controlling a frame structure of the signals, and wherein the second station returns signals carrying signalling to the repeater in a first format if the signalling information obtained does not indicate that the first station is a repeater of said type and in a second format different from the first format if the signalling information obtained indicates that the first station is a repeater of said type.

15. A method as claimed in claim 14, wherein the repeater applies a given transformation to the synchronisation pattern in the repeated signals only if it is a repeater of said type.

16. A method as claimed in claim 15, wherein said transformation consists in inverting the sign of one only of the real and imaginary parts of the first baseband signal formed by remodulation.

17. A method as claimed in claim 11, wherein the second baseband signal obtained by the second station is a differential signal.

18. A method as claimed in claim 11, wherein the first baseband signal comprises successive frames which may belong to at least two different logical channels, and wherein each frame of the first baseband signal contains at least one synchronisation pattern selected by the first station on the basis of signalling information identifying the logical channel to which said frame belongs.

19. A method as claimed in claim 11, wherein the first baseband signal comprises successive frames, wherein each frame of the first baseband signal is generated in response to a flow of digital symbols according to a modulation selected from several possible modulations, and wherein each frame of the first baseband signal contains at least one synchronisation pattern selected by the first station on the basis of signalling information identifying the modulation according to which said frame is generated.

20. A method as claimed in claim 19, wherein the possible modulations comprise a coded modulation and a non-coded modulation.

21. A radio communication receiver comprising means for generating a complex baseband signal from a received radio signal, means for detecting a synchronisation signal including at least one synchronisation pattern in a portion of said baseband signal, for computing parameters for synchronising with a transmitter and/or parameters for estimating a radio transmission channel between the transmitter and the receiver, and means for demodulating another portion of said baseband signal with the aid of the computed parameters to extract transmitted information therefrom, the means for detecting being arranged to search a plurality of synchronisation patterns of a predetermined set of patterns in said baseband signal and obtain signalling information in response to the detection of a pattern of the set and as a function of the detected pattern, and wherein said set of patterns contains a first pattern whose real and imaginary parts have substantially identical auto-correlations and a cross-correlation substantially lower than said auto-correlations, and a second pattern which is a conjugate complex of the first pattern.

22. A receiver as claimed in claim 21, comprising means for storing the real and imaginary parts of the first pattern, wherein the means for detecting the synchronisation signal comprise:
   means for computing a first correlation between the real part of the baseband signal and the real part of the first pattern;
   means for computing a second correlation between the imaginary part of the baseband signal and the imaginary of the first pattern;
   means for computing a third correlation between the real part of the baseband signal and the imaginary part of first the pattern;
   means for computing a fourth correlation between the imaginary part of the baseband signal and the real part of the first pattern;
   means for computing a first decision variable given by the square of the difference between the first and second correlations plus the square of the sum of the third and fourth correlations;
   means for computing a second decision variable given by the square of the sum of the first and second correlations plus the square of the difference between the third and fourth correlations;
   means for taking a decision in response to verification of a detection criterion by at least one of the first and second decision variables, to detect the first synchronisation pattern if the first decision variable is higher than the second decision variable to detect the second pattern if the second decision variable is higher than the first decision variable, and to obtain a signalling information bit, whose value differs depending on whether the first or second pattern is detected.

23. A receiver as claimed in claim 21, wherein said signalling information comprises information which differs depending on whether or not the transmitter is a repeater of a type which demodulates and remodulates repeated signals without controlling a frame structure of the signals, the receiver further comprising transmission means for returning to the transmitter signals carrying signalling in a first format if the signalling information obtained does not indicate that the transmitter is a repeater of said type and in a second format different from the first format if the signalling information obtained indicates that the transmitter is a repeater of said type.

24. A receiver as claimed in claim 21, wherein said baseband signal comprises successive frames which may belong to at least two different logical channels and each having at least one synchronisation pattern, the receiver further comprising means to assign to one of the logical channels the information obtained by the means for demodulating with respect to each frame, said logical channel being chosen as a function of the signalling information obtained in response to detection of a pattern from the set within said frame.

25. A receiver as claimed in claim 21, wherein said baseband signal comprises successive frames each having at least one synchronisation pattern, and wherein the means for detecting are arranged to issue a command to the means (for transforming) for demodulating to choose a type of demodulation to be applied to each frame of the baseband signal from several possible demodulation types depending on the signalling information obtained in response to detection of a pattern from the set within said frame.

26. A radio communication transmitter comprising modulation means for generating a complex baseband signal in response to a flow of digital symbols, according to a phase modulation such that the modulated phase is anti-symmetrical as a function of the symbols of the flow, means for transmitting, toward at least one receiver, a radio signal formed from said baseband signal, and means for selecting a synchronisation sequence from a given set of sequences on the basis of signalling information to be supplied to the transmitter, the selected sequence being included in said flow of symbols to generate a synchronisation signal included in said baseband signal to enable the receiver to compute synchronisation parameters and/or parameters for estimating a radio transmission channel, and wherein said given set of sequences contains at least one first sequence giving rise to a synchronisation pattern whose real and imaginary parts have substantially identical auto-correlations and a cross-correlation substantially lower than said auto-correlations, and a second sequence opposite the first sequence.

27. A transmitter as claimed in claim 26, wherein said baseband signal comprises successive frames which may belong to at least two different logical channels, and wherein the means for selecting are so arranged that each frame of said baseband signal contains at least one synchronisation pattern selected on the basis of signalling information identifying the logical channel to which said frame belongs.

28. A transmitter as claimed in claim 26, wherein said baseband signal comprises successive frames, wherein each frame of the baseband signal is generated in response to a flow of digital symbols according to a modulation selected from a plurality of possible modulations, and wherein the means for selecting are so arranged that each frame of the baseband signal contains at least one synchronisation pattern selected on the basis of signalling information identifying the modulation according to which said frame is generated.

29. A radio communication transmitter comprising means for transmitting, toward at least one receiver, a radio signal formed from a complex baseband signal including a synchronisation signal to enable the receiver to compute synchronisation parameters and/or parameters for estimating a radio transmission channel, means for selecting at least one synchronisation pattern from a predetermined set of patterns on the basis of signalling information to be supplied to the receiver, to include the selected pattern in the synchronisation signal, wherein said predetermined set of patterns comprises a first pattern whose real and imaginary parts have substantially identical auto-correlations and a cross-correlation substantially lower than said auto-correlations, and a second pattern which is a complex conjugate of the first pattern.

30. A transmitter as claimed in claim 29, wherein said baseband signal comprises successive frames which may belong to at least two different logical channels, and wherein the means for selecting are so arranged that each frame of said baseband signal contains at least one synchronisation pattern selected on the basis of signalling information identifying the logical channel to which said frame belongs.

31. A transmitter as claimed in claim 29, wherein said baseband signal comprises successive frames, wherein each frame of the baseband signal is generated in response to a flow of digital symbols according to a modulation selected from a plurality of possible modulations, and wherein the means for selecting are so arranged that each frame of the baseband signal contains at least one synchronisation pattern selected on the basis of signalling information identifying the modulation according to which said frame is generated.

32. A radio signal repeater comprising means for generating a first baseband signal from a received radio signal, means for detecting a synchronisation signal containing at least one synchronisation pattern generated in response to at least one sequence of synchronisation symbols in a portion of the first baseband signal, to compute parameters for synchronising with a transmitter and/or parameters for estimating a radio transmission channel from said transmitter, means for demodulating another portion of the first baseband signal with the aid of the computed parameters, to generate a flow of demodulated symbols, means for generating a second baseband signal from the flow of demodulated symbols and each sequence of synchronisation symbols detected, and means for transmitting, toward at least one receiver, another radio signal formed from the second baseband signal with a frame structure corresponding to a frame structure of the received radio signal, and wherein the means for generating the second baseband signal comprise means for transforming at least one detected sequence of synchronisation symbols and a modulator for generating the second baseband signal in response to the flow of demodulated symbols contained in the transformed sequence.

33. A repeater as claimed in claim 32, wherein said baseband signals are complex signals generated by a phase modulation such that the modulated phase is anti-symmetrical as a function of the symbols to be modulated, wherein said synchronisation pattern has real and imaginary parts which have substantially identical auto-correlations and a cross-correlation substantially lower than said auto-correlations, and wherein the means for transforming comprise means for inverting the sign of the symbols of the detected synchronisation sequence.

34. A radio signal repeater comprising means for generating a first baseband signal from a received radio signal, means for detecting a synchronisation signal containing at least one synchronisation pattern generated in response to at least one sequence of synchronisation symbols in a portion of the first baseband signal, to compute parameters for synchronising with a transmitter and/or parameters for estimating a radio transmission channel from said transmitter, means for demodulating another portion of the first baseband signal with the aid of the computed parameters, to generate a flow of demodulated symbols, means for generating a second baseband signal from the flow of demodulated symbols and each detected sequence of synchronisation symbols, and means for transmitting, toward at least one receiver, another radio signal formed from the second baseband signal with a frame structure corresponding to a frame structure of the received radio signal, and wherein the means for generating the second baseband signal comprise a modulator for generating an intermediate baseband signal in response to the flow of demodulated symbols with the detected sequence, and means for obtaining the second baseband signal by transforming the intermediate baseband signal in a period corresponding to a synchronisation pattern.

35. A repeater as claimed in claim 34, wherein said baseband signals being complex signals, said synchronisation pattern has real and imaginary parts which have substantially identical auto-correlations and a cross-correlation which is substantially lower than said auto-correlations, and wherein said transforming consists in inverting the sign of one only of the real and imaginary parts of the intermediate baseband signal generated by the modulator.

* * * * *

UNITED STATES PATENT AND TRADEMARK OFFICE
CERTIFICATE OF CORRECTION

PATENT NO. : 6,829,317 B2
DATED : December 7, 2004
INVENTOR(S) : Philippe Mege et al.

It is certified that error appears in the above-identified patent and that said Letters Patent is hereby corrected as shown below:

Column 18,
Lines 46-47, "the means (for transforming) for demodulating" should be -- the means for demodulating --.

Signed and Sealed this

Twenty-second Day of February, 2005

JON W. DUDAS
*Director of the United States Patent and Trademark Office*